United States Patent [19]

Thompson et al.

[11] Patent Number: 5,650,452
[45] Date of Patent: Jul. 22, 1997

[54] VERY LOW DENSITY MOLDED POLYURETHANE FOAMS VIA ISOCYANATE-TERMINATED PREPOLYMERS

[75] Inventors: Andrew M. Thompson, West Chester, Pa.; James L. Lambach, Charleston, W. Va.

[73] Assignee: ARCO Chemical Technology, L.P., Greenville, Del.

[21] Appl. No.: 544,629

[22] Filed: Oct. 18, 1995

[51] Int. Cl.$^6$ ............................................. C08G 8/10
[52] U.S. Cl. ............................................. 521/159; 521/174
[58] Field of Search ........................... 521/159; 11/174

[56] References Cited

U.S. PATENT DOCUMENTS

| | | | |
|---|---|---|---|
| 4,727,094 | 2/1988 | Hoy et al. | 521/164 |
| 5,070,114 | 12/1991 | Watts et al. | 521/159 |
| 5,158,922 | 10/1992 | Hinney et al. | 502/175 |
| 5,248,833 | 9/1993 | Hinney et al. | 568/621 |
| 5,278,197 | 1/1994 | Jacobs | 521/155 |
| 5,470,813 | 11/1995 | Le-Khac | 502/175 |
| 5,482,908 | 1/1996 | Le-Khac | 502/156 |

OTHER PUBLICATIONS

R. E. Knox, "Molding of Prepolymer Based Resilient Urethane Foam", Rubber World, 139 (1959) 685.

G.F. Lunardon et al., "Production of Soft Block Foams & TDI based Cold–Cure Molded Foams with No Use of CFC," 32nd Annual Tech/Mark. Conference, Oct. 1–4, 1989 pp. 239–245.

*Primary Examiner*—Morton Foelak
*Attorney, Agent, or Firm*—Jonathan L. Schuchardt

[57] ABSTRACT

Very soft, very low density, all water-blown polyurethane foams are prepared by reacting an isocyanate-terminated prepolymer with from 30% to 150% stoichiometric excess of water. The foams have molded densities less than or equal to 1.5 lb/ft$^3$ and softness, as measured by 25% ILD of less than or equal to 15 lbs., yet retain excellent resiliency, tear strength and elongation. The foams are suitable for use in cushioning applications such as those traditionally employing polyester fiberfill.

12 Claims, No Drawings

VERY LOW DENSITY MOLDED POLYURETHANE FOAMS VIA ISOCYANATE-TERMINATED PREPOLYMERS

TECHNICAL FIELD

The present invention pertains to very low density molded polyurethane foams prepared from isocyanate-terminated prepolymers. More particularly, the present invention pertains to very low density molded polyurethane foams of enhanced softness, prepared by reacting an isocyanate-terminated prepolymer with a large stoichiometric excess of water. The soft, low density foams are suitable replacements for fiberfill such as polyester, in upholstery and bedding applications.

BACKGROUND ART

Polyurethane flexible foams are well recognized articles of commerce which have applications in numerous diverse fields. Flexible polyurethane foams are prepared by the reaction of a di- or polyisocyanate with an isocyanate reactive component in the presence of a suitable urethane reaction-promoting catalyst, a chemical or physical blowing agent, and a suitable foam stabilizing surfactant. Although much early research in the area of polyurethane foams involved the use of isocyanate-terminated prepolymers and quasi-prepolymers, the bulk of polyurethane flexible foam produced commercially is prepared by the so-called "one-shot" technique. The "one-shot" process was developed due to its flexibility and the inability to prepare molded foams by the prepolymer process. Although the "one-shot" process requires the foam manufacturer to inventory a variety of different ingredients, the process remains the predominant polyurethane foam technology today.

In the "one-shot" technique, two or more separate streams of isocyanate, polyol, catalyst, blowing agents, etc., or combinations thereof, are introduced into a mix head. The reactive mixture exiting the mix head may be allowed to rise freely, generally on a lined conveyor, to produce slab foam, or may be poured or injected into molds to produce molded foam. Slab foam may be sliced to thicknesses suitable for carpet underlay, seat cushions, and the like. Molded foam allows complex contours to be produced, for example for use in automotive seating. Due to the differences between the free rise associated with slab foam and the constrained rise of molded foam, the polyurethane reactive ingredients are tailored to the specific application.

While physical blowing agents such as methylene chloride, chlorofluorocarbons (CFC's) and low boiling alkanes have been used as physical blowing agents, their use has been severely curtailed by environmental concerns, particularly the Montreal Protocol. High resilience polyurethane flexible foams have employed water as a reactive blowing agent for many years. Water reacts with a portion of the isocyanate groups present to generate an amine and carbon dioxide. The amine reacts with additional isocyanate to produce urea linkages, while the carbon dioxide provides the necessary blowing effect.

The urea groups generated in high resilience foam tend to harden the foam. The fraction of urea groups as compared to urethane groups in high resilience foam in the nominal 2–4 lb/ft$^3$ density range is small enough so that the increased hardness can be compensated by suitable choice of the polyurethane reactive ingredients, particularly polyols and crosslinkers. However, as the density decreases below the 2 lb/ft$^3$ range, increased levels of water and isocyanate necessary to achieve lower density result in unacceptable hardness due to the increased urea group content. To lower the hardness, physical blowing agents such as methylene chloride have been added. Methylene chloride appears to exert a plasticizing effect, increasing foam softness. However, the use of methylene chloride is environmentally undesirable.

There is a long-standing need for exceptionally soft, very low density polyurethane flexible foams, for example those having densities of 1.5 lb/ft$^3$ or less, and 25% indentation load deflections (ILD) of less than 15 lbs. Such soft, low density foams can be used as replacements for soft cushioning material such as polyester fiberfill, and for other uses as well.

In copending U.S. application Ser. No. 08/311,378 is disclosed a one-shot formulation suitable for hypersoft, low density polyurethane flexible foams. While the formulations disclosed therein produce a foam with the desired density and softness, a prepolymer process is not disclosed.

Prepolymer and quasi-prepolymer technology has been used in the past to prepare free rise high resilience slab foam employing water as a reactive blowing agent. However, attempts to lower density while at the same time affording a very soft foam have not been successful. In general, as with one-shot water-blown foams, the increased amount of water used as a blowing agent increases the urea-group content of the foam. Low density foams prepared from such formulations have been too firm for use in cushioning applications. Prepolymer techniques have seldom been employed for high resilience molded foam.

R. E. Knox, "Molding of Prepolymer Based Resilient Urethane Foam," RUBBER WORLD, 139, 1959, pp. 685–692 discloses the use of isocyanate-terminated prepolymers admixed with additional toluene diisocyanate, reacted with water at 5% above the stoichiometric equivalent. Despite the presence of c.a. 5% didecylphthalate plasticizer, the 2 to 2.5 lb/ft$^3$ foams exhibited ILDs which were still in the range of 20 lbs. Moreover, rather than reduce part weight by further density reduction, Knox proposes core molding instead, attesting to the problems associated with low density, all-water blown prepolymer foam.

J. H. Sanders and K. C. Frisch in POLYURETHANES, CHEMISTRY AND TECHNOLOGY, Part II, "Technology," Interscience Publishers, N.Y., in Chapter VII, "Flexible Foams" discusses the use of water in conjunction with isocyanate-terminated prepolymers to produce flexible polyurethane foams. However, this treatise indicates that a large excess of water will use up the free isocyanate groups, reducing the isocyanate available for effective cross-linking. Although foam density decreases with increasing water content, when 30–50% water in excess of stoichiometry is used, physical properties are said to markedly decrease, and therefore only a 10–20% excess is used to foam prepolymers. A 1.3 lb/ft$^3$ one-shot (not prepolymer) foam is disclosed on page 65 of the reference. However, even with the addition of 10 parts CFC-11 per 100 parts polyol, foam hardness is quite high, in the range of 24–30 lbs.

In U.S. Pat. No. 5,070,114, free rise and molded foam employing specific prepolymers is disclosed. The prepolymers are prepared by reacting a polyol component, preferably one with from 10 to 25% by weight oxyethylene residues, with a particular blend of MDI isomers containing from 2 to 40% of 2,4'-MDI. One example of a foam with a free rise density of 1.25 lb/ft$^3$ is exemplified, prepared from a prepolymer derived from the reaction of an isophoronediamine-modified, urea-containing isocyanate with a polyol having 14% ethylene oxide moieties, the prepolymer having an NCO group content of 11.3%. However, the resulting foam was firm and in addition had low elongation and tear strength, the latter being but 1 lb/in.

G. F. Lunardon et al., "Production of Soft Block Foams and TDI-Based Cold Cure-Molded Foams With No Use of CFCs", 32ND ANNUAL POLYURETHANE TECHNICAL/MARKETING CONFERENCE, Oct. 1–4, 1989, discloses use of specialized TDI-derived prepolymers including both a conventional polyol and a polyol with high ethylene oxide content to produce water-blown polyurethane foam. The prepolymers have little polyol content, the NCO group content ranging from 38.5 to 42.5 weight percent, and the range of water used is conventional, resulting in foams in the 3 lb/ft$^3$ range.

All water-blown prepolymer foams having densities of less than 1.5 lb/ft$^3$ and simultaneously having a 25% ILD of less than 15 lbs have not previously been prepared. It would be desirable to provide a process for their preparation, and compositions suitable for use therein. It would be further desirable to prepare soft, low density foams having the aforementioned characteristics which provide acceptable tear strength and elongation.

SUMMARY OF THE INVENTION

It has now been surprisingly discovered that very low density, all-water blown, molded polyurethane foams which, at the same time, are very soft, exhibiting 25% ILDs less than 15 lbs, may be prepared from isocyanate-terminated prepolymers by employing from 30 to 150% stoichiometric excess of water. The foams unexpectedly retain physical properties such as elongation and tear strength.

DESCRIPTION OF THE PREFERRED EMBODIMENTS

The polyurethane foams of the present invention are characterized by a density of less than 1.5 lbs/ft$^3$, preferably about 1.3 lbs/ft$^3$ or less, and more particularly about 1 lb/ft$^3$, and a 25% ILD, as measured by ASTM D-3574 Tests B1 and B2, of 15 lb. or less. The foams are all-water blown. By the term "all water-blown" is meant that water is essentially used as a reactive blowing agent. It would not depart from the spirit of the invention to employ a small proportion of a physical blowing agent. However, the use of even small amounts of such blowing agents is undesired and unnecessary.

The isocyanate-terminated prepolymers employed in the subject invention are the reaction product of an excess of a di- or polyisocyanate or mixture thereof with a polyether polyol component having a nominal average functionality of from 2–8, preferably 2–4, more preferably 2–3, a hydroxyl number of from 12–56, preferably from 15–30, and a content of oxyethylene moieties of from 0–30 weight percent, preferably 5–30 weight percent, and most preferably 8–20 weight percent. The polyol component may comprise but a single polyol meeting these requirements, or may be a blend of several polyols. The amount of isocyanate and polyol are selected so as to provide an isocyanate-terminated prepolymer containing 12 to 22 weight percent free NCO groups, and preferably 14 to 20 weight percent free NCO groups.

The polyols of the polyol component of the isocyanate-terminated prepolymer may be a conventional polyether polyol prepared by oxyalkylating a suitably functional initiator molecule with one or more alkylene oxides, preferably propylene oxide and ethylene oxide, or may be a polymer-modified polyol, i.e., a polyether polyol containing dispersed polymer particles. Examples of polymer-modified polyols include polyols containing dispersed vinyl polymers, preferably polymers of styrene, acrylonitrile, or their mixtures, PIPA polyols, and PHD polyols, all recognized polyols of commerce. Mixtures of conventional polyether polyols and polymer-modified polyols may also be used. Preferably, the amount of polymer-modified polyol is minor if foams of very low softness are desired.

The polyether polyols used herein may be prepared conventionally, i.e. by the base catalyzed oxyalkylation of a suitable initiator, may be prepared using catalysts such as barium hydroxide or metal naphthenates, and are preferably prepared by the double metal cyanide complex catalyzed oxyalkylation of an initiator, preferably an oligomeric initiator, by the processes described in U.S. Ser. Nos. 08/156,534 and 08/302,296 or U.S. Pat. Nos. 5,158,922 and 5,248,833. The advantage of double metal cyanide complex catalyzed polyols lies in the lower monol content of such polyols and the availability of higher equivalent weight polyols at any given functionality. The unsaturation of the polyol component, as measured by ASTM D-2849-69 "Testing of Urethane Foam Polyol Raw Materials", is preferably 0.07 meq unsaturation/g polyol or less, more preferably 0.02 meq/g or less, and in particular 0.01 meq/g or less.

As stated previously, the polyol component nominal functionality may range from 2 to 8, is preferably from 2 to 4, and most preferably from 2 to 3. Nominal functionalities of individual polyols may be higher, for example 8, when polyol blends are employed. By "nominal functionality" is meant the theoretical functionality determined by the number of oxyalkylatable hydrogens on the initiator molecule. When double metal cyanide complex catalysts are used for oxyalkylation, the measured functionality is generally close to the nominal functionality, particularly when the double metal cyanide complex oxyalkylation catalysts of U.S. Ser. Nos. 08/156,534 and 08/302,296, herein incorporated by reference, are employed. However, when traditional base, i.e., KOH catalysis is used, the measured functionality may be considerably less than the nominal functionality, particularly at higher equivalent weights.

Polyol nominal functionalities of 2 to 3 are particularly preferred. The polyol functionality in the case of polyol blends may be determined by the sum of the mol fraction contribution of each polyol. Thus, a mixture of 50 mol percent of a nominally difunctional polyol and 50 mol percent of a nominally trifunctional polyol will be 2.5. Equivalent weights of the polyols suitably range from 1000 Da to 5000 Da, preferably 1500 Da to 4000 Da, and advantageously between 1500 Da and 3000 Da. Equivalent weights and molecular weights in Da (Daltons) are number average molecular weights.

The oxyethylene content of the polyols may range from 0 weight percent to 30 weight percent, and may be present as randomly incorporated oxyethylene moieties, as a polyoxyethylene cap, or both randomly incorporated and capped. A substantial benefit of the subject invention prepolymer process is that the demold and cure times of the foam are largely independent of the amount of primary hydroxyl content of the prepolymer polyol. Small amounts, i.e. up to about 15 weight percent of the polyol component, may comprise polyols with high oxyethylene content.

Examples of isocyanates which may be used to form the prepolymer are toluene diisocyanates (TDIs), methylenediphenylenediisocyanates (MDIs) including MDI variants, aliphatic isocyanates such as 1,6-diisocyanatohexane and isophorone diisocyanate, and modified isocyanates such as the reaction products of the above-identified isocyanates with minor quantities of glycols, polyols, diamines, or water, to form so-called "urethane-modified" or "urea-modified" isocyanates, or reaction of isocyanates with themselves to form carbodiimide, allophanate, or uretonimine modified isocyanates. Mixtures of di- and polyisocyanates can be used.

The prepolymers of the subject invention are prepared conventionally, for example by thermally induced reaction of the isocyanate component with the polyol components, generally at temperatures of from 50° C. to 120° C. Urethane promoting catalysts such as tin compounds, i.e., dibutyltin diacetate or dibutyltin dilaurate, inorganic acids, and the like may be added to increase the rate of prepolymer formation, if desired, and when such are used, allow prepolymer preparation at lower temperatures, for example room temperature. Methods of prepolymer preparation are well known to those skilled in the art, and are discussed, for example in the POLYURETHANE HANDBOOK, Gunter Oertel, Ed., Hanser Publishers, Munich© 1985, and "Polyurethanes: Chemistry And Technology", J. H. Sanders and K. C. Frisch, INTERSCIENCE PUBLISHERS, New York, 1963.

The prepolymer thusly prepared is reacted with a considerable stoichiometric excess of water, i.e. an excess of 30 to 150 percent over stoichiometry on an equivalent weight basis, preferably 30 to 80 percent, more preferably from 35 to 80 percent, and most preferably 35 to 65 percent, excess water on this basis. The stoichiometric quantity of water is calculated by converting the weight percentage of isocyanate (NCO) groups in the isocyanate-terminated prepolymer to equivalents. The number of isocyanate equivalents must be matched by the number of water equivalents to achieve 100% stoichiometry. The equivalents of water are then increased by the desired degree of excess, i.e., 30% to 150%. It is believed that the excess water acts partially as a physical blowing agent, further decreasing the foam density. Surprisingly, the physical properties of the resultant foams are retained, the foams exhibiting good cell structure, along with excellent elongation and tear strength. The latter are especially important in cushioning applications in the furniture industry, where the molded foam product often must be inserted into upholstered coverings, pillow cases, etc., without tearing.

A catalyst is generally necessary in preparing the subject foams. Such catalysts are well known, and include the amine catalysts, noted for catalyzing both the polyol/isocyanate and water/isocyanate reaction, and catalysts which essentially promote urethane group formation. Examples of suitable catalysts include diethylene triamine, 1,4-diazabicyclo [2.2.2]octane, and the tin catalysts described previously. Most preferred is an amine catalyst available from OSi, Inc. under the trade name Niax® A-1. Additional catalysts may be found in "Polyurethanes: Chemistry And Technology", op.cit., Chapt. IV, pp. 129–217, and POLYURETHANE HANDBOOK, Chapter 3, §3.4.1, pp. 90–95. By the term "polymerization catalyst" as used herein is meant one or more catalysts effective to promote reaction between the isocyanate-terminated prepolymer and isocyanate-reactive ingredients to form the polymer product. The amount of catalyst is readily ascertained by one skilled in the art, and preferably ranges from 0.1 part to 5 parts per 100 parts molded foam.

A foam stabilizing surfactant is also generally necessary. Silicone surfactants suitable for use in molded foam are preferred. Other examples of suitable surfactants and catalysts may be found in the Saunders and Frisch treatise previously cited, the patent literature, and in the POLYURETHANE HANDBOOK on pages 98–101.

Additional components may be added to the reactive ingredients to tailor physical properties or increase processing latitude. Optional ingredients include chain extenders and cross-linkers. These are preferably low molecular weight di- and higher functionality, isocyanate-reactive compounds such as ethylene glycol, propylene glycol, diethylene glycol, dipropylene glycol, tripropylene glycol, 1,4-butanediol, 1,6-hexanediol, glycerine, trimethylolpropane, and in particular the various alkanol amines, preferably diethanolamine and triethanolamine. Minor quantities of additional conventional polyether or polymer-modified polyols may be used. However, if added in significant quantity, competition for isocyanate groups between the polyol hydroxyl group and water may decrease the blowing effectiveness of the latter. The result will be a foam of a higher density, i.e., greater than 1.5 lb/ft$^3$.

Determination of whether a given quantity of chain extender or cross-linker is outside the scope of the present invention, whether of low molecular weight, oligomeric, or polymeric, may be readily determined by foaming the formulation in a closed mold and measuring the molded foam density ($\leq 1.5$ lb/ft$^3$) and 25% ILD ($\leq 15$ lb.). These tests are routine and quickly and easily performed. It is most preferable that the entire quantity of polyol be incorporated into the isocyanate-terminated prepolymer itself, and that when processing aids such as chain extenders and/or cross-linkers are to be used, that they be dissolved in the water to be added.

Fillers, dyes, pigments, antioxidants, flame-retardants, and other commonly used additives and/or auxiliaries may be used, preferably added to the prepolymer, but in the case of isocyanate-reactive additives and/or auxiliaries which might present a problem with respect to storage stability, may be added together with water, or as a separate stream to the mix head.

Having generally described this invention, a further understanding can be obtained by reference to certain specific examples which are provided herein for purposes of illustration only and are not intended to be limiting unless otherwise specified.

EXAMPLE 1

An isocyanate-terminated prepolymer having 16.6 weight percent free NCO groups was prepared from a nominally difunctional polyoxypropylene/polyoxyethylene diol, having a molecular weight of c.a. 4000 Da and containing 20 weight percent oxyethylene moieties as a cap. The prepolymer was prepared conventionally by reacting 100 parts polyol with 69 parts of an 80/20 blend of TDI and polymeric MDI.

The isocyanate-terminated prepolymer described above (100 parts) was mixed with 5.0 parts water (40% stoichiometric excess based on prepolymer NCO group content), 0.18 parts Niax® A-1 catalyst, and 1.5 parts OSi silicone surfactant Y-10,515 in a standard laboratory mixer and molded in a closed mold (demold time 5 minutes) and cured to produce a molded article of good foam quality with the following properties:

| | |
|---|---|
| Molded Density | 1.0 lb/ft$^3$ |
| Resiliency | 51% |
| 25% IFD | 13.6 lbs |

| | |
|---|---|
| 65% IFD | 43.4 lbs |
| 65/25 Support Factor | 3.18 |
| Elongation at Break | 250% |
| Tear Strength | 2.59 lb/in |

The low density of 1.0 lb/ft$^3$ is exceptional, but especially surprising is the low 25% IFD of only 13.6 lbs. The elongation at break and tear strength are exceptional for such a low density, soft foam.

EXAMPLE 2

An isocyanate-terminated prepolymer prepared as in Example 1, from 100 parts diol and 58 parts isocyanate, had an NCO group content of 14.8 weight percent. To 100 parts prepolymer was added 4.43 parts water (40% in excess of stoichiometry), 0.19 parts Niax® A-1 catalyst, and 0.6 parts OSi silicone surfactant Y-10,515, and mixed in a laboratory mixer prior to introduction into a closed mold (demold time 5 minutes). The cured, molded polyurethane article had the following properties:

| | |
|---|---|
| Molded Density | 1.3 lb/ft$^3$ |
| Resiliency | 48% |
| 25% IFD | 11.6 lbs |
| 65% IFD | 39.2 lbs |
| 65/25 Support Factor | 3.37 |
| Elongation at Break | 273% |
| Tear Strength | 2.45 lb/in |

Despite being of higher density (1.3 lb/ft$^3$) than the foam of Example 1, the foam had exceptional softness, as indicated by the 25% ILD of only 11.6 lbs. The elongation was higher at 273%, and the tear strength only slightly lower.

Examples 3–6 illustrate the flexibility of the present invention with respect to polyol functionality, selection of isocyanate, and ability to incorporate cross-linkers such as DEOA in either the prepolymer (A-side) or water (B-side) of the formulation. In each case, a low density foam of exceptional softness was produced, even when employing large amounts of water (Example 3, 57% excess) and even when employing minor amounts (Example 3) of polymer-modified polyols.

EXAMPLE 3

An isocyanate-terminated prepolymer having 18.8 weight percent free NCO groups was prepared from 85 parts of a nominally hexafunctional polyoxypropylene/polyoxyethylene polyol, having a molecular weight of c.a. 12000 Da and containing 16% oxyethylene moieties as a cap, 15 parts of a nominally trifunctional polyoxypropylene/polyoxyethylene polyol, having a molecular weight of c.a. 4800 Da and containing 19% oxyethylene moieties as a cap, and further containing 38% polymer (SAN) particles as a dispersion, 1 part diethanol amine, and 76 parts TDI (20/80 2,6-toluene diisocyanate/2,4-toluene diisocyanate).

The isocyanate-terminated prepolymer described above (100 parts) was mixed with 6.2 parts water (57% stoichiometric excess based on prepolymer NCO group content), 0.28 parts Niax A-1 catalyst, and 0.85 parts Air Products silicone surfactant DC5164 in a standard laboratory mixer and molded in a closed mold (demold time 5 minutes) and cured to produce a molded article of good foam quality with a density of 0.98 lb/ft$^3$ and a 25% IFD of 13 lbs.

EXAMPLE 4

An isocyanate-terminated prepolymer having 15 weight percent free NCO groups was prepared from 90 parts of a nominally hexafunctional polyoxypropylene/polyoxyethylene polyol, having a molecular weight of c.a. 12000 Da and containing 16% oxyethylene moieties as a cap, 10 parts of a nominally difunctional polyoxypropylene/polyoxyethylene polyol, having a molecular weight of c.a. 4000 Da and containing 20% oxyethylene moieties as a cap and 50 parts of a mixture comprising 80% TDI (20/80 2,6-toluene diisocyanate/2,4-toluene diisocyanate) and 20% crude MDI.

The isocyanate-terminated prepolymer above (100 parts) was mixed with 4.9 parts water (50% stoichiometric excess based on prepolymer NCO group content), 0.19 parts Niax A-1 catalyst, and 0.5 parts OSi silicone surfactant L540 in a standard laboratory mixer and molded in a closed mold (demold time 5 minutes) and cured to produce a molded article of good foam quality with a density of 1.6 lb/ft$^3$, a 25% IFD of 15 lbs., elongation of 112%, and tear strength of 1.3 lb/in.

EXAMPLE 5

An isocyanate-terminated prepolymer having 13.7 weight percent free NCO groups was prepared from 20 parts of a nominally hexafunctional polyoxypropylene/polyoxyethyelene polyol, having a molecular weight of c.a. 12000 Da and containing 16% oxyethylene moieties as a cap, 80 parts of a nominally difunctional polyoxypropylene/polyoxyethylene polyol, having a molecular weight of c.a. 4000 Da and containing 20% oxyethylene moieties as a cap and 53 parts of mixture comprising 80% TDI (20/80 2,6-toluene diisocyanate/2,4-toluene diisocyanate) and 20% crude MDI.

The isocyanate-terminated prepolymer described above (100 parts) was mixed with 4.0 parts water (50% stoichiometric excess based on prepolymer NCO group content), 0.17 parts Niax A-1 catalyst, and 0.67 parts Air Products Silicone Surfactant DC5164 in a standard laboratory mixer and molded in a closed mold (demold time 5 minutes) and cured to produce a molded article of good foam quality with a density of 1.5 lb/ft$^3$, a 25% IFD of 11.8 lbs., elongation of 185%, and tear strength of 2.2 lb/in.

EXAMPLE 6

The isocyanate-terminated prepolymer described in Example 5 (100 parts) was mixed with 4.0 parts water (50% stoichiometric excess based on prepolymer NCO group content), 0.67 pts diethanolamine, 0.17 parts Niax A-1 catalyst, and 0.67 parts Air Products Silicone Surfactant DC5164 in a standard laboratory mixer and molded in a closed mold (demold time 5 minutes) and cured to produce a molded article of good foam quality with a density of 1.4 lb/ft$^3$, a 25% IFD of 14.0 lbs., elongation of 88%, and tear strength of 1.0 lb/in.

Having now fully described the invention, it will be apparent to one of ordinary skill in the art that many changes and modifications can be made thereto without departing from the spirit or scope of the invention as set forth herein.

What is claimed is:

1. A process for the preparation of an all-water blown, prepolymer derived, soft, very low density molded polyurethane foam having a molded density of less than or equal to 1.5 lb/ft$^3$ and a softness as measured by 25% ILD of less than or equal to 15 lbs., said process comprising:

a) selecting as a prepolymer an isocyanate-terminated prepolymer prepared by reacting a stoichiometric excess of a di- or polyisocyanate component with a polyoxyalkylene polyol component comprising one or more polyoxyalkylene polyols having an oxyethylene group content of form 0 to about 30 weight percent, said polyoxyalkylene polyol component having a nominal average hydroxyl functionality of from 2 to 8, and a hydroxyl number of from about 12 to 56, said isocyanate-terminated prepolymer having a free NCO group content of from 12 to about 22 weight percent based on the weight of said isocyanate-terminated prepolymer;

b) admixing said isocyanate-terminated prepolymer with water in an amount of from 30 mol percent to 150 mol percent stoichiometric excess based on the NCO group content of said isocyanate-terminated prepolymer, to form a foamable polyurethane reactive mixture;

c) introducing said foamable polyurethane reactive mixture into a mold to form a demoldable, foamed polyurethane product; and d) curing said demoldable foamed polyurethane product and recovering a cured polyurethane product having a density less than or equal to 1.5 lb/ft$^3$ and a 25% ILD of 15 lb or less.

2. The process of claim 1 wherein said polyoxyalkylene polyether polyol component has an average nominal functionality of from 2 to about 3; said isocyanate-terminated prepolymer has a free NCO group content of from 14 to about 20 weight percent; and wherein water is employed in an amount from 30 mol percent to 80 mol percent in excess of the stoichiometric amount based on the NCO group content of said isocyanate-terminated prepolymer.

3. The process of claim 1 wherein at least one of said polyoxyalkylene polyols in said polyoxyalkylene polyether polyol component has an oxyethylene content of from 5 to 30 weight percent.

4. The process of claim 1 wherein said di- or polyisocyanate is selected from the group consisting of TDIs, MDIs, and mixtures thereof.

5. The process of claim 1 further comprising admixing with a) and b) one or more polymerization catalysts in an amount of from 0.1 to about 5.0 weight percent based on foam weight.

6. The process of claim 1 wherein said polyoxyalkylene polyol component comprises a polyoxyalkylene diol having an equivalent weight of from 1000 Da to 5000 Da and an oxyethylene content of 0% to 30% by weight.

7. The process of claim 6 wherein said polyoxyalkylene polyol component further comprises a polyoxyalkylene triol having an equivalent weight of from 1000 Da to 5000 Da and an oxyethylene content of 0% to 30% by weight.

8. The process of claim 2 wherein said di- or polyisocyanate comprises TDIs, or a mixture of TDIs and MDIs.

9. The process of claim 1 wherein said molded density is about 1.3 lbs/ft$^3$ or less.

10. The process of claim 1 wherein said molded density is less than about 1.0 lb/ft$^3$.

11. The process of claim 1 wherein said polyoxyalkylene polyol component contains a polymer-modified polyoxyalkylene polyol.

12. A process for the preparation of an all-water blown, prepolymer derived, soft, very low density molded polyurethane foam having a molded density of less than or equal to 1.5 lb/ft$^3$ and a softness as measured by 25% ILD of less than or equal to 15 lb, said process comprising:

a) selecting as a prepolymer an isocyanate-terminated prepolymer prepared by reacting a stoichiometric excess of an isocyanate component comprising TDIs, MDIs, or mixtures thereof, with a polyoxyalkylene polyol component comprising one or more polyoxyalkylene polyols having an oxyethylene group content of from 5 to about 30 weight percent, said polyoxyalkylene polyol component having a nominal average hydroxyl functionality of from 2 to 3, and a hydroxyl number of from about 15 to 30, said isocyanate-terminated prepolymer having a free NCO group content of from 14 to about 20 weight percent based on the weight of said isocyanate-terminated prepolymer;

b) admixing said isocyanate-terminated prepolymer with:

b)i) an effective amount of a catalyst;

b) ii) an effective cell stabilizing amount of one or more surfactants; and b) iii) water in an amount of from 35 mol percent to 65 mol percent stoichiometric excess based on the NCO group content of said isocyanate-terminated prepolymer, to form a foamable polyurethane reactive mixture;

c) introducing said foamable polyurethane reactive mixture into a mold to form a demoldable, foamed polyurethane product;

d) curing said demoldable foamed polyurethane product and recovering a cured polyurethane product having a density less than or equal to 1.5 lb/ft$^3$ and a 25% ILD of 15 lb. or less.

* * * * *